US008200097B2

(12) United States Patent
Cole

(10) Patent No.: US 8,200,097 B2
(45) Date of Patent: Jun. 12, 2012

(54) OPTOELECTRONIC MODULE FORM-FACTOR ADAPTER

(75) Inventor: Christopher R. Cole, Redwood City, CA (US)

(73) Assignee: Finisar Corporation, Sunnyvale, CA (US)

( * ) Notice: Subject to any disclaimer, the term of this patent is extended or adjusted under 35 U.S.C. 154(b) by 862 days.

(21) Appl. No.: 12/205,589

(22) Filed: Sep. 5, 2008

(65) Prior Publication Data

US 2010/0061069 A1    Mar. 11, 2010

(51) Int. Cl.
*H04B 10/00* (2006.01)
(52) U.S. Cl. ........................... 398/153; 398/117
(58) Field of Classification Search .................. 398/153, 398/117
See application file for complete search history.

(56) References Cited

U.S. PATENT DOCUMENTS

| 7,044,656 | B1 | 5/2006 | Hofmeister et al. | |
|---|---|---|---|---|
| 2006/0008210 | A1* | 1/2006 | Cornell et al. | 385/48 |
| 2007/0237468 | A1 | 10/2007 | Aronson et al. | |
| 2009/0016685 | A1* | 1/2009 | Hudgins et al. | 385/92 |

\* cited by examiner

*Primary Examiner* — Kinam Park
(74) *Attorney, Agent, or Firm* — Maschoff Gilmore & Israelsen

(57) ABSTRACT

In one example embodiment, an adapter module includes a body having a first form-factor and multiple receptacles extending into the body. Each of the receptacles is configured to receive an optoelectronic module having a second form-factor. The second form-factor is smaller than the first form-factor. The first form-factor may substantially conform to the CFP MSA, for example. The second form-factor may substantially conform to the SFP+ or QSFP MSA, for example.

20 Claims, 10 Drawing Sheets

OPTOELECTRONIC MODULE FORM-FACTOR ADAPTER

BACKGROUND OF THE INVENTION

1. The Field of the Invention

The present invention generally relates to high speed optoelectronic modules and host devices. In particular, some example embodiments relate to an adapter configured to provide an interface between a host device configured to receive an optoelectronic module of a first form-factor and multiple optoelectronic modules having a second form-factor.

2. The Related Technology

In the field of data transmission, one method of efficiently transporting data is through the use of fiber optics. Digital data is propagated through a fiber optic cable or cables using light emitting diodes or lasers. Light signals allow for extremely high transmission rates and very high bandwidth capabilities. Also, light signals are resistant to electromagnetic interference that would otherwise interfere with electrical signals. Light signals are more secure because they do not allow portions of the signal to escape from the optical fiber as can occur with electrical signals in wire-based systems. While there may be an evanescent field that enables one to siphon some portion of the light off the fiber by bending the fiber such that it is possible to tap fiber communications without breaking the fiber, it is in general much more difficult than for electrical communications. Light also can be conducted over greater distances without the signal loss typically associated with electrical signals on copper wire.

Although fiber optic networks exhibit the desirable characteristics described above, there continues to exist a need for using other types of communication devices. For example, most computers or other electronic devices that communicate using optical networks are electrical, and conduct electrical signals over electrically conductive materials. Additionally, in the networking context, electrical networks that transmit electrical signals continue to be widespread. For these and other reasons, optical networks typically include optoelectronic modules, such as transceivers or transponders, which provide interfaces between electrically-based host devices and optical portions of the network.

Host devices typically include one or more receptacles, each receptacle configured to receive an optoelectronic module conforming to a particular form-factor. Many form-factors have been or are in the process of being defined in industry Multi-Source Agreements ("MSAs"), including the Small Form-factor Pluggable ("SFP") MSA, the 10 Form-factor Pluggable ("XFP") MSA, the SFP plus ("SFP+") MSA, the Improved Pluggable Form-factor ("IPF") MSA, the Quad SFP ("QSFP") MSA, the 100 Form-factor Pluggable ("CFP") MSA (for both 40 G and 100 G applications), and the like. Each MSA typically specifies, among other things, the mechanical form-factor, electrical interface—including high-speed interface for data signals, low speed interface for hardware and/or firmware, and power supply—and thermal interface of the optoelectronic module and the corresponding host device receptacle.

One example of a conventional optoelectronic module 100 and host device 102 configured to conform to the CFP MSA are illustrated in FIG. 1. The optoelectronic module 100 includes a body 104 conforming to the mechanical form-factor specified by the CFP MSA with two optical ports 103 configured to send and receive optical signals. The host device 102 includes a front panel 106, host printed circuit board ("PCB") 108, host guides 110, and host connector 112 that together define a host receptacle conforming to the CFP MSA mechanical form-factor and configured to receive the optoelectronic module 100.

The CFP MSA further specifies the electrical interface between the host connector 112 and the optoelectronic module 100. The specified electrical interface includes the pinout on the host connector 112 and optoelectronic module 100, the number of available data lanes, data rate capabilities per data lane, signal processing (e.g., CDR re-timing, EDC signal conditioning, and/or FEC capabilities), a hardware interface protocol, a firmware interface protocol, and a power supply arrangement. The specified electrical interface can include a 10×10 G ("CAUI") high-speed interface, a 4×10 G ("XLAUI") high-speed interface, and/or two XLAUI high-speed interfaces.

The CFP MSA further specifies thermal management capabilities. For instance, the CFP MSA specifies that the optoelectronic module 104 be configured to interface with a riding heatsink connected to the host guides 110 or that it include an integrated heatsink.

One purpose served by MSAs is to enable interoperability between host devices and optoelectronic modules conforming to the same MSA. However, host devices and optoelectronic modules conforming to different MSAs are typically incompatible due to differences in the mechanical form factor and/or electrical interfaces of each, despite the fact that two different form factors may provide similar functionality.

For instance, in some applications it may be desirable to operate a CFP-compatible host device with a XLAUI high-speed interface at approximately 40 G. In this case, a single QSFP module, which may be cheaper than a CFP module, could provide the desired 40 G bandwidth. However, the QSFP module cannot be substituted for the CFP module in the CFP-compatible host device due to form-factor incompatibilities. Particularly, QSFP modules have a smaller mechanical form-factor than CFP modules and lack the CDR re-timing required for some CFP applications.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

In general, example embodiments of the invention relate to an adapter configured to provide an interface between a host device and multiple optoelectronic modules.

In one example embodiment, an adapter module includes a body having a first form-factor and multiple receptacles extending into the body. Each of the receptacles is configured to receive an optoelectronic module having a second form-factor. The second form-factor is smaller than the first form-factor. The adaptor module also includes a printed circuit board disposed within the body and signal processing circuitry disposed on the printed circuit board. The signal processing circuitry is configured to process parallel transmit signals transmitted to the plurality of optoelectronic modules from a host device in order to divide the parallel transmit signals into sets of parallel transmit signals that are compatible with an electrical interface of the plurality of optoelectronic modules.

In another example embodiment, an adapter module includes a first connector configured to couple to a mating connector on a host device. A parallel transmit bus is coupled to the first connector and is configured to carry a first set of parallel data signals. The adapter includes multiple second connectors, each second connector being coupled to a different portion of the parallel transmit bus and configured to couple to a different optoelectronic module. The adapter further includes a parallel receive bus having multiple portions, each portion of the parallel receive bus being coupled to a different second connector. The parallel receive bus is configured to transmit a second set of parallel data signals from the second connectors to the first connector.

In yet another example embodiment, an adapter module includes a body having a first form-factor. A printed circuit board is disposed within the body. A first connector is connected to the printed circuit board and is configured to couple to a mating connector on a host device, the host device including a receptacle configured to receive the body. Multiple second connectors are connected to the printed circuit board and are configured to couple to optoelectronic modules conforming to a second form-factor. A parallel transmit bus is coupled between the first connector and the second connectors and is configured to carry parallel data signals from the first connector to the second connectors. A parallel receive bus is coupled between the second connectors and the first connector and is configured to carry parallel data signals from the second connectors to the first connector.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The principles of the embodiments described herein describe the structure and operation of several examples used to illustrate the present invention. It should be understood that the drawings are diagrammatic and schematic representations of such example embodiments and, accordingly, are not limiting of the scope of the present invention, nor are the drawings necessarily drawn to scale. Well-known devices and processes have been excluded so as not to obscure the discussion in details that would be known to one of ordinary skill in the art.

The embodiments disclosed herein are generally related to a form-factor adapter configured to allow multiple modules of one form-factor to be plugged into a host receptacle configured to receive a single module of another form-factor that is larger than the first form-factor. As used herein, "form-factor" can refer to the mechanical form-factor, the electrical interface, and/or the thermal interface of the host receptacle or optoelectronic module. In contrast, when "form-factor" is preceded by the term "mechanical," it refers to the mechanical dimensions of the host receptacle or optoelectronic modules. Accordingly, the adapter can provide signal processing on high-speed data signals sent from the host receptacle to the modules, and/or from the modules to the host receptacle, in order to adapt the high-speed interface specified of modules' form-factor to the high-speed interface of the host receptacle's form-factor. Alternately or additionally, the adapter can adapt the power supply, hardware interface, and/or firmware interface of the modules' form-factor to the power supply, hardware interface, and/or firmware interface of the host receptacle's form-factor. Alternately or additionally, the adapter can provide thermal management for the modules.

The embodiments disclosed herein may be implemented on various types of optoelectronic modules of various operating speeds and conforming to various form-factor MSAs, including, but not limited to, the emerging CFP MSA, the QSFP MSA, the XFP MSA, the SFP+MSA, the IPF MSA, and the like or any combination thereof As used herein, the term "optoelectronic module" includes modules having both optical and electrical components. Examples of optoelectronic modules include, but are not limited to transponders, transceivers, transmitters, and/or receivers. Optoelectronic modules can be used, for instance, in telecommunications networks, local area networks, metro area networks, storage area networks, wide area networks, and the like.

I. Operating Environment

Figure 2:
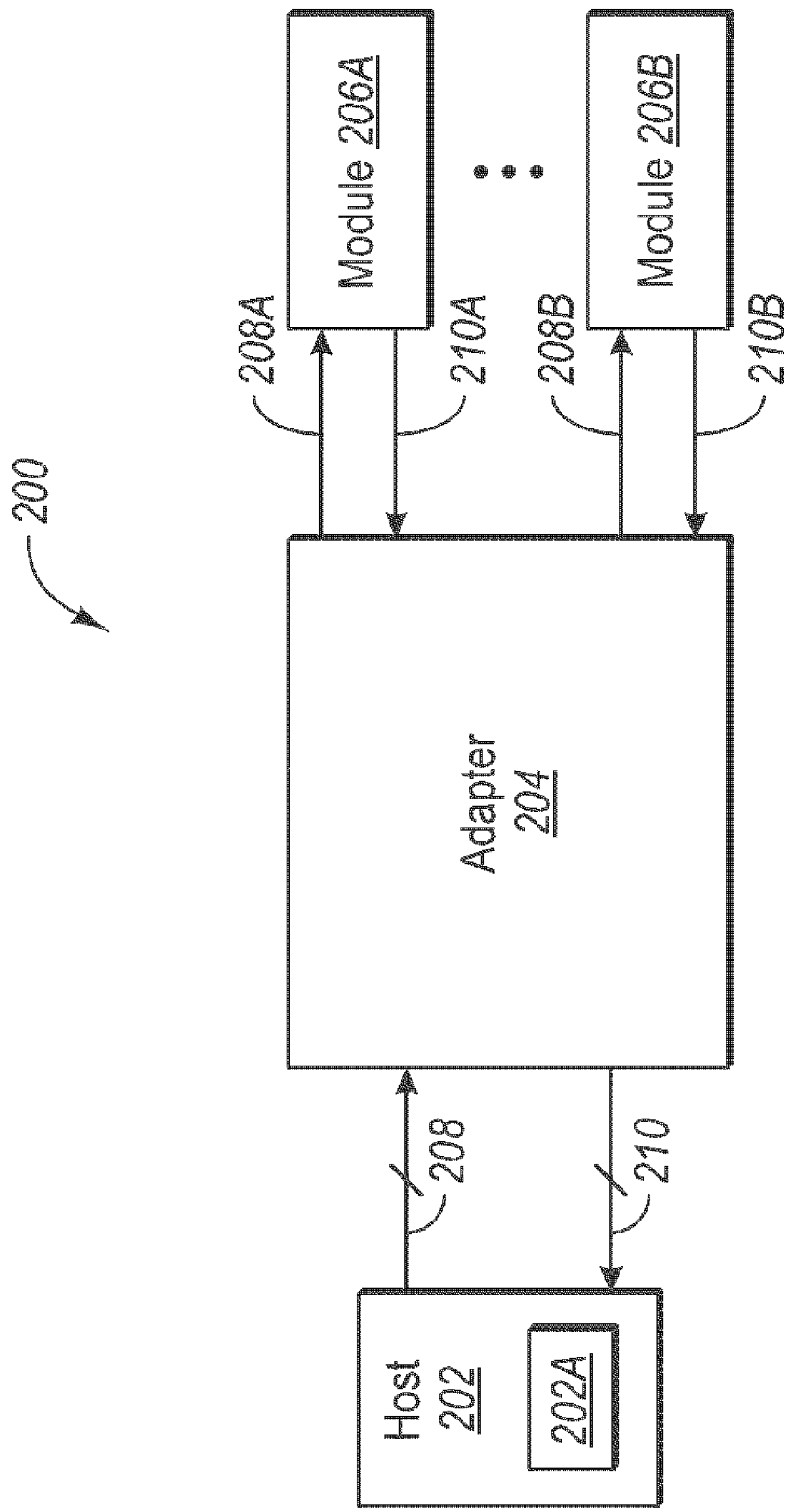
FIG. 2 discloses an example operating in which embodiments of the invention can be practiced.

Turning to FIG. 2, an example operating environment 200 is disclosed in which embodiments of the invention can be practiced. The example operating environment includes a host device 202 configured to receive one or more optoelectronic modules of a first form-factor, an adapter 204 configured to provide an interface between the first form-factor and a second form-factor, and two or more optoelectronic modules 206A, 206B conforming to the second form-factor.

In general, the host device 202 is configured to transmit and receive electrical data over an optical communication network. The electrical-to-optical and optical-to-electrical conversion of the data can be provided by one or more optoelectronic modules configured to plug into or otherwise be received by the host device 202. The host device 202 can thus include one or more ports conforming to a particular first form-factor MSA that specifies the mechanical form factor of a receptacle in each port and of the corresponding optoelectronic modules, and of the electrical interface between the host device 202 and each optoelectronic module. For instance, the host device 202 can include one or more ports conforming to the CFP MSA, each port including a receptacle configured to receive a CFP optoelectronic module and further including a CFP-compliant electrical interface. The CFP-compliant electrical interface may include a 100 G high-speed electrical interface such as the CAUI high-speed interface, a 40 G high-speed electrical interface such as the XLAUI high-speed interface, or an 80 G high-speed electrical interface that includes two XLAUI high-speed interfaces.

More generally, the host device 202 can include a Media Access Control ("MAC") component 202A at each port configured to transmit a plurality of high-speed parallel transmit signals 208 out of and receive a plurality of high-speed parallel receive signals 210 into the port. For instance, the host device 202 can be configured to transmit up to twelve parallel transmit signals 208 and to receive up to twelve parallel receive signals. Alternately or additionally, the host device 202 can be configured to transmit/receive more or less than twelve parallel signals, such as four or eight parallel signals. The data rate of each of the parallel transmit and receive signals 208, 210 is substantially equal to 10 Gigabits per second ("10 G") in some embodiments, although the data rate of the parallel transmit and receive signals 208, 210 can alternately be more or less than 10 G.

In some embodiments of the invention, the MAC component 202A of the host device 202 is further configured to provide a Physical Coding Sublayer ("PCS") function, including auto-negotiation and/or 64B/66B encoding/decoding on the parallel transmit signals 208 and/or parallel receive signals 210.

As already mentioned, each port of the host device 202 typically includes a receptacle (not shown) substantially conforming to the first form-factor, while the two or more optoelectronic modules 206A, 206B substantially conform to the second form-factor. In some embodiments, the optoelectronic modules 206A, 206B conform to the QSFP MSA or the SFP+MSA.

The adapter 204 is configured to provide a mechanical, electrical, and/or thermal interface between the host device 202 and the two or more optoelectronic modules 206A, 206B. In particular, the mechanical form-factor and electrical interface at the host-side 204A of the adapter 204 are configured to substantially conform to the first form-factor while the adapter 204 includes two or more ports at the module-side 204B of the adapter configured to substantially conform to the second form-factor. Thus, the adapter 204 is configured to adapt the mechanical form-factor, electrical interface, thermal management, and/or other aspects of the optoelectronic modules 206A, 206B specified for the second form-factor to suit the mechanical form-factor, electrical interface, thermal management, and/or other aspects of the host device 202 specified for the first form-factor.

In operation, the adapter 204 receives the plurality of parallel transmit signals 208 from the host 202 and divides them into two or more sets 208A, 208B of parallel transmit signals, each of the two or more sets 208A, 208B being provided to a different one of the two or more optoelectronic modules 206A, 206B. In some embodiments, prior to providing the sets 208A, 208B of parallel transmit signals to the optoelectronic modules 206A, 206B, the adapter can perform some form of signal processing on the sets 208A, 208B to ensure that the sets 208A, 208B of parallel transmit signals conform to the electrical interface specified for the form-factor of the optoelectronic modules 206A, 206B. As used herein "signal processing" refers to any act performed on a signal that includes, but is not limited to, re-timing, electronic dispersion compensation, and/or forward error correction. Each of the two or more optoelectronic modules 206A, 206B converts the set 208A, 208B of parallel transmit signals received from the adapter 204 to one or more optical transmit signals which are emitted onto an optical communication network.

Each of the two or more optoelectronic modules 206A, 206B also receives one or more optical receive signals from the optical communication network and converts them to a set 210A, 210B of parallel receive signals. The adapter 204 receives the two or more sets 210A, 210B from the two or more optoelectronic modules 206A, 206B and combines them into parallel receive signals 210 which are provided to the host device 202. In some embodiments, the adapter 204 can perform some form of signal processing on the sets 210A, 210B to ensure the sets 210A, 210B of parallel receive signals conform to the electrical interface specified for the form-factor of the host device 202.

II. First Embodiment

Referring now to FIG. 3 A, an embodiment of an adapter designated generally at 300A is shown which may correspond to the adapter 204 of FIG. 2. The adapter 300A has a first connector 302 connected to a printed circuit board ("PCB") 303 and configured to mate with a corresponding connector 204 of a host device 206. In some embodiments, for example, the first connector 302 is defined by the CFP MSA and includes two XLAUI high-speed interfaces specified for some applications by the CFP MSA. An 8-line parallel transmit bus 308 is connected to the first connector 302 and is configured to carry parallel electrical data signals from the first connector 302 to second connectors 312, 314 connected to the PCB 303. More specifically, the transmit bus 308 is split into two portions 308A, 308B, each portion connected to second connector 312 or 314.

Each of the second connectors 312 and 314 is configured to mate with a corresponding connector 316, 318 on optoelectronic modules 320, 322. In some embodiments, each of the second connectors 212, 214 is defined by the QSFP MSA and includes a XLAUI high-speed interface specified by the QSFP MSA. Further, each of the optoelectronic modules 320, 322 can comprise a 40 G QSFP form-factor module. Each of the optoelectronic modules 320, 322 has appropriate circuitry, including for example lasers and laser drivers, for converting the parallel electrical data signals received from the host 306 via the adapter 300A to one or more optical signals and outputting the one or more optical signals onto one or more optical fibers via one or more optical connectors 324 or 325.

The adapter 300A can also include a hardware interface 326 and/or a firmware interface 327 connected between the first connector 302 and the second connectors 312, 314. In some embodiments, a protocol such as I²C, MDIO, SPI, or the like is implemented on the hardware and/or firmware interfaces 326, 327.

One or more optical signals are also received by the optoelectronic modules 320, 322 from one or more optical fibers via one or more optical connectors 328, 330 inserted in the optoelectronic modules 320, 322. The one or more optical signals are converted to parallel electrical data signals. The conversion may be facilitated by using, for example, photodiodes and related electronic circuitry. The parallel electrical data signals are sent through the second connectors 312, 314 over an 8-line parallel receive bus 331 to the first connector 302. The receive bus 331 is split into two portions 331A, 331B, each portion connected to second connector 312 or 314.

Optionally, the adapter 300A can include signal processing circuitry 332 connected to the PCB 303 on the transmit bus 308 and/or receive bus 331 and configured to provide signal processing on the parallel data signals carried by the transmit bus 308 and/or receive bus 331. For example, the signal processing circuitry 332 can include a plurality of clock and data recovery circuits ("CDRs") configured to re-time the parallel electrical data signals on the transmit bus 308 and/or receive bus 331. Alternately or additionally, the circuitry 332 can include a plurality of electronic dispersion compensation circuits ("EDCs") configured to provide signal conditioning for the parallel data signals carried by the transmit bus 308 and/or receive bus 331. Alternately or additionally, the circuitry 332 can include a plurality of forward error correction circuits ("FECs") configured to perform forward error correction on the parallel electrical data signals on the transmit bus 308 and/or receive bus 331. Thus, if the host device 306 requires signal processing not provided by the optoelectronic modules, the signal processing can be provided by the circuitry 332.

Alternately or additionally, the adapter 300A can include a device 333, such as a micro-controller or programmable logic device ("PLD"), configured to translate signals received from the host device 306 via hardware interface 326 and/or firmware interface 327 to a format understandable by the optoelectronic modules 320, 322 and vice versa. For instance, the host device 306 and optoelectronic modules 320, 322 may implement different protocols for hardware and/or firmware interfaces per the different electrical interfaces specified for the host device 306 and optoelectronic modules 320, 322. When different protocols are implemented, the device 333 may be configured to translate between the two protocols. In this manner, the adapter 300A is configured to provide status, alarm, and/or control functions for the optoelectronic modules 320, 322 consistent with the status, alarm and/or control functions of the host device 306.

Alternately or additionally, the adapter 300A can be configured to convert a power supply received from the host device 306 to a power supply that can be used by the optoelectronic modules 320, 322. For instance, the host device 306 may conform to a first form-factor MSA that specifies one type of power supply while the optoelectronic devices 320, 322 conform to a second form-factor MSA that specifies a different type of power supply.

Alternately or additionally, the adapter 300A can be configured to provide thermal management for the optoelectronic modules 320, 322.

Figure 3A:
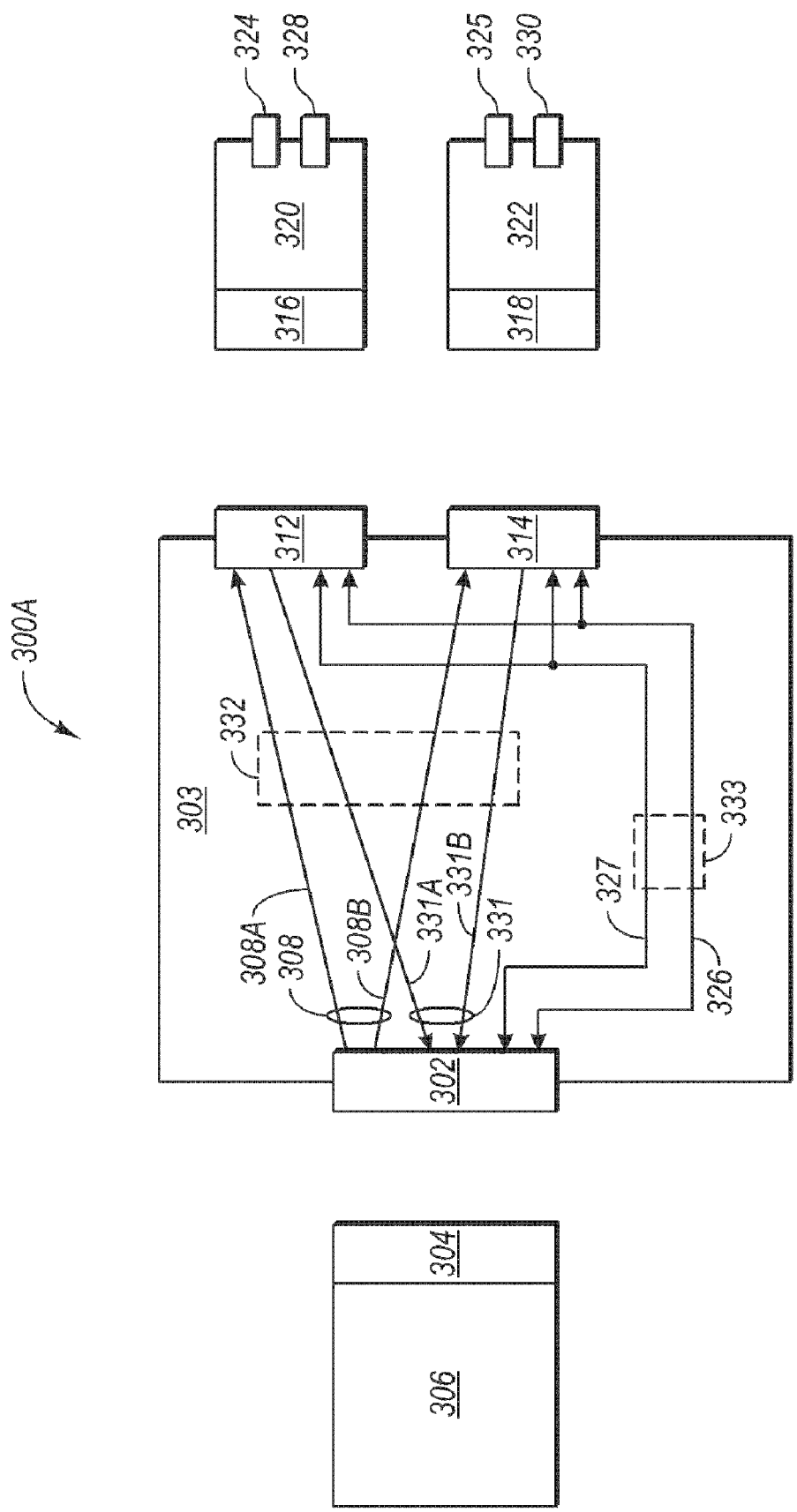
FIGS. 3A-3C disclose examples of an adapter configured to provide an interface between a host device compliant with a first MSA and two optoelectronic modules conforming to a second MSA.
Figure 3B:
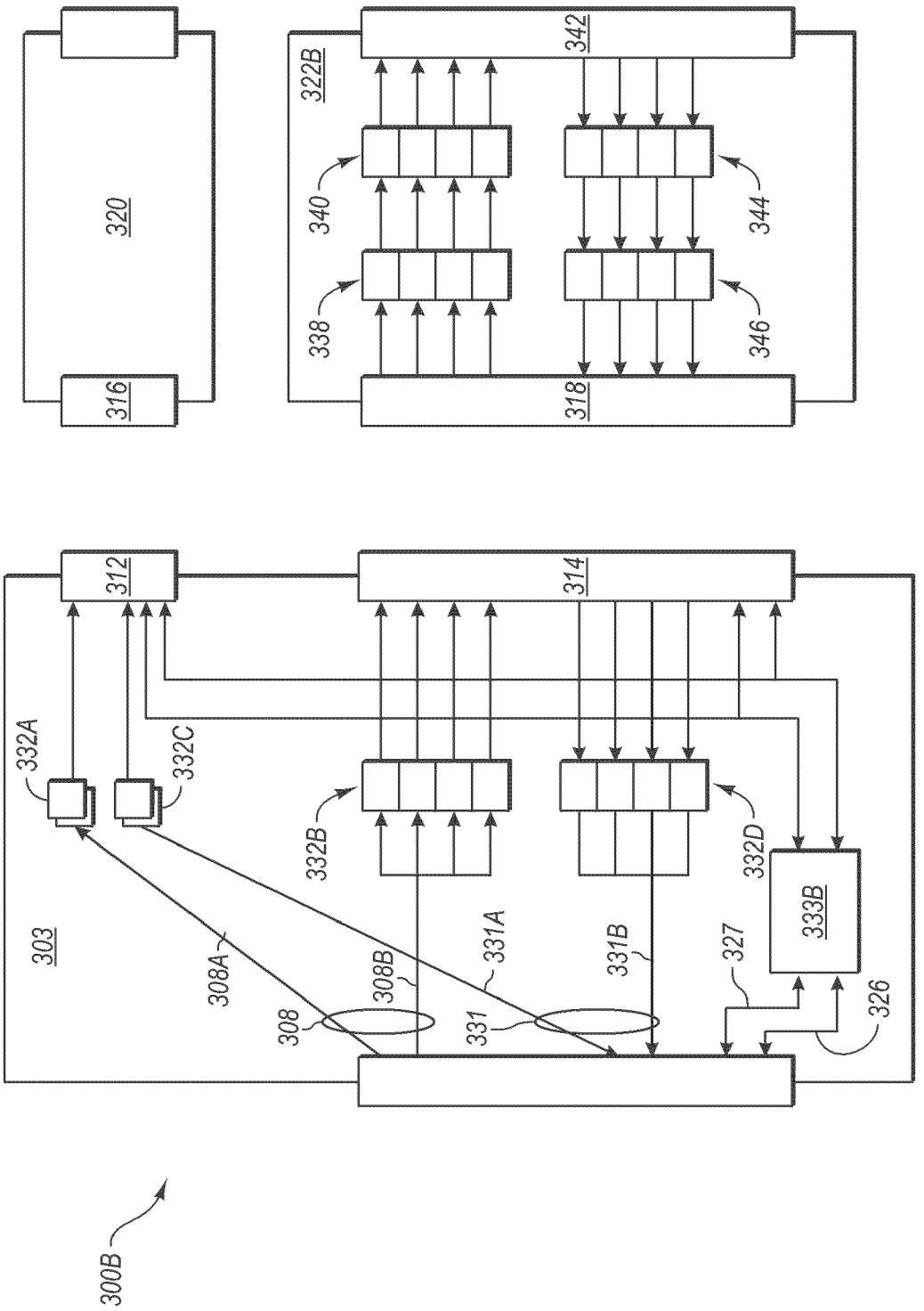

Additional details regarding examples 300B, 322B of the adapter 300A and optoelectronic module 322 of FIG. 3A are disclosed in the block diagram of FIG. 3B. In particular, example adapter 300B disclosed in FIG. 3B includes first connector 302, PCB 303, second connectors 312 and 314, transmit bus 308, receive bus 331, hardware interface 326 and firmware interface 327. In the block diagram of FIG. 3B, greater detail is provided with respect to portions 308B and 332B of the transmit and receive buses 308 and 331 and optoelectronic module 322B than with respect to portions 308A and 331A of the transmit and receive buses 308 and 331 and optoelectronic module 320 as they are redundant and can be similarly configured.

As shown in FIG. 3B, the adapter 300B includes a plurality of transmit CDRs 332A and 332B and receive CDRs 332C and 332D configured to re-time the parallel electrical data signals on the transmit bus 308 and receive bus 331 that are provided to and received from optoelectronic modules 320, 322B. Alternately or additionally, the signal processing circuits 332A-332D can comprise EDCs or FECs.

In the disclosed example of FIG. 3B, transmit CDRs 332A are configured to re-time parallel electrical data signals on the portion 308A of the transmit bus 308 that provides parallel electrical data signals to optoelectronic module 320, while transmit CDRs 332B are configured to re-time parallel electrical data signals on the portion 308B of the transmit bus 308 that provides parallel electrical data signals to optoelectronic module 322B. Further, receive CDRs 332C are configured to re-time parallel electrical data signals on the portion 331A of the receive bus 331 that receives parallel electrical data signals from optoelectronic module 320, while receive CDRs 332D are configured to re-time parallel electrical data signals on the portion 331B of the receive bus 331 that receives parallel electrical data signals from optoelectronic module 322B. Each of the transmit and receive CDRs 332A, 332B, 332C and 332D can receive a reference clock signal, e.g., from the host device 306 via first connector 302, in order to re-time the parallel electrical data signals on the transmit and receive buses 308, 331.

FIG. 3B additionally discloses various components that can be included in the optoelectronic module 322B. For instance, the optoelectronic module 322B can include a plurality of laser drivers 338. The laser drivers 338 are coupled to the electrical connector 318 of the optoelectronic module 322B and receive the re-timed parallel electrical data signals from the transmit CDRs 332B on the portion 308B of the transmit bus 308. Each of the laser drivers 338 is additionally coupled to a different one of a plurality of lasers 340 and is configured to modulate a corresponding one of the lasers 340 to emit an optical signal representative of the re-timed parallel electrical data signal received by the laser driver 338. In the example of FIG. 3B, each of the emitted optical signals is output onto a separate optical fiber included in a set of parallel ribbon fibers (e.g., 12-strand multimode fiber) via a multi-fiber push on ("MPO") optical connector 342 corresponding to the optical connectors 326 and 330 of FIG. 3A. Alternately, the emitted optical signals can be optically multiplexed into a single multiplexed optical signal and output onto a single optical fiber.

The optoelectronic module 322B additionally includes a plurality of photodiodes 344, each configured to receive an optical signal from a separate optical fiber included in the set of parallel ribbon fibers via MPO optical connector 342. The photodiodes 344 are coupled to a plurality of amplifiers 346 and are configured to convert the received optical signals to parallel electrical data signals which can be amplified by the amplifiers 346 before being provided to the adapter 300B via connector 318 on the optoelectronic module 322B and second connector 314 on the adapter 300B.

The amplified parallel electrical data signals are received by the adapter 300B on the portion 331B of the receive bus 331 and re-timed by the receive CDRs 332D before being provided to the host device via the first connector 302.

As shown in FIG. 3B, the adapter 300B additionally includes device 333B. The device 333B is configured to translate signals in a first protocol received from the host device via hardware/firmware interfaces 326, 327 to a second protocol implemented by the optoelectronic modules 320, 322B, and vice versa. Thus, the optoelectronic modules 320, 322B can be implemented with the host device even if they implement different protocols on their hardware and/or firmware interfaces than the host device.

Figure 3C:
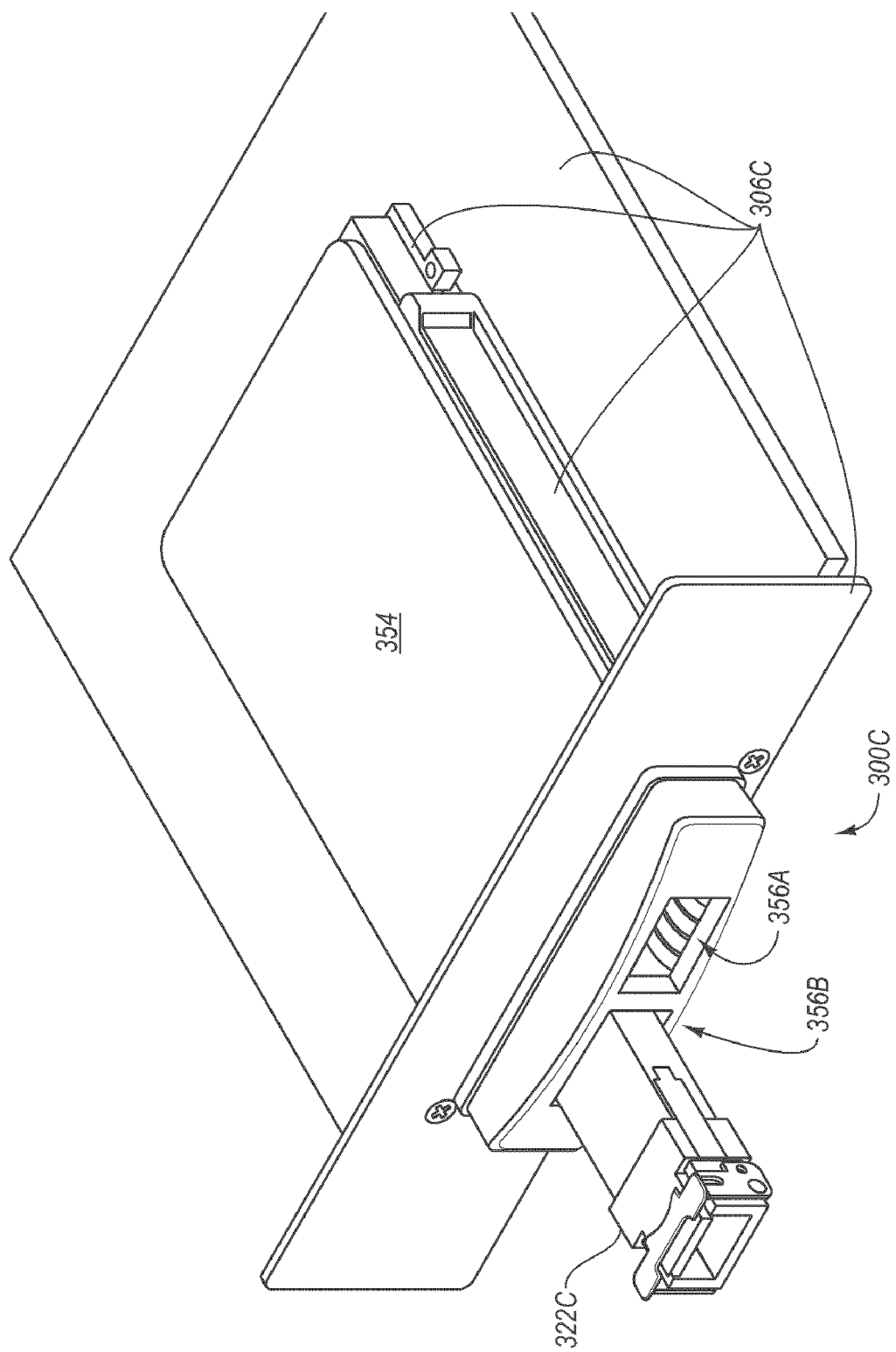

FIG. 3C discloses a perspective view of another example 300C of the adapter 300A of FIG. 3A. As shown, the adapter 300C is plugged into a host device 306C and includes a body 354 configured to substantially conform to the CFP MSA. The adapter 300C includes two receptacles 356A, 356B extending into the body 354, each receptacle 356A, 356B configured to receive optoelectronic modules configured to substantially conform to the QSFP MSA. In particular, one optoelectronic module 322C substantially conforming to the QSFP MSA is shown partially inserted into the receptacle 356B and the receptacle 356A is configured to receive a similarly configured optoelectronic module.

A PCB (not shown) corresponding to the PCB 303 of FIGS. 3A and 3B may be disposed within the body 354. The first connector 302, second connectors 312, 314, signal processing circuitry 332, 332A-332D and/or device 333, 333B of FIGS. 3A and 3B can be disposed on the PCB within the body 354 of the adapter 300C.

Figure 1:
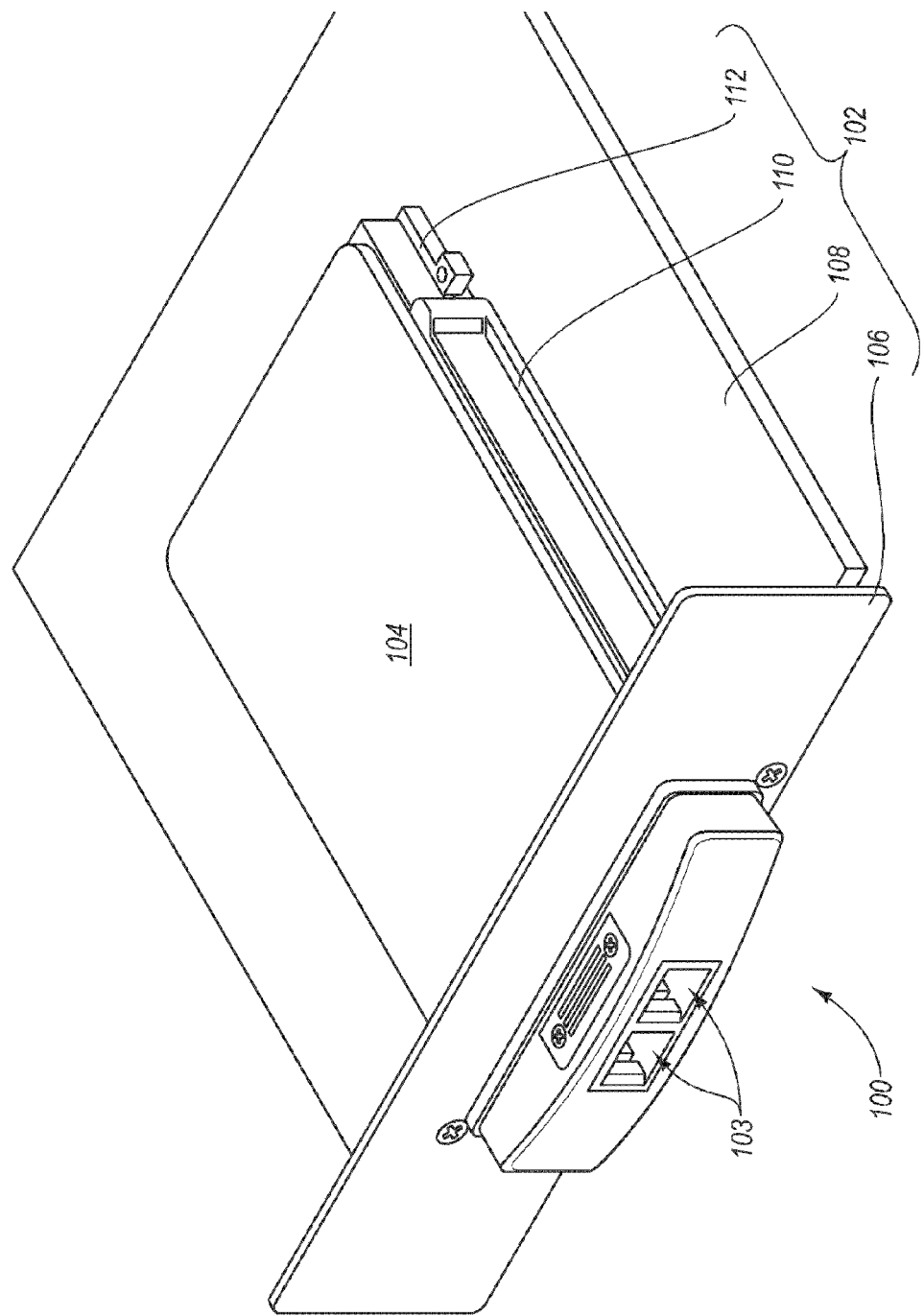
FIG. 1 discloses an example of a conventional host device and optoelectronic module.

In the example embodiment of FIGS. 3A-3C, adapters 300A-300C, (collectively referred to herein as "adapter 300"), can include the same mechanical form-factor, host-side electrical interface, and other aspects defined by the CFP MSA as the dedicated CFP module 100 of FIG. 1 which can be configured for a data rate substantially equal to 100 G. However, the adapter 300 also includes two module-side receptacles 356A, 356B and corresponding electrical interfaces to receive two lower-data rate QSFP modules, each configured for a data rate substantially equal to 40 G. In this case, the use of two lower data rate QSFP modules results in an aggregate data rate of 80 G that almost matches the 100 G aggregate data rate the host device 306C is configured for.

Further, the adapter 300C can provide signal processing, such as re-timing, for the high-speed signals communicated between the CFP-compliant host device 306C and the QSFP-compliant optoelectronic modules, which may be required to comply with the CFP MSA but not to comply with the QSFP MSA. Moreover, the adapter 300C can convert a power supply received from the CFP-compliant host device 306C to a power supply that can be used by QSFP optoelectronic modules received in receptacles 356A, 356B and/or can provide thermal management for the QSFP optoelectronic modules.

III. Second Embodiment

Figure 4A:
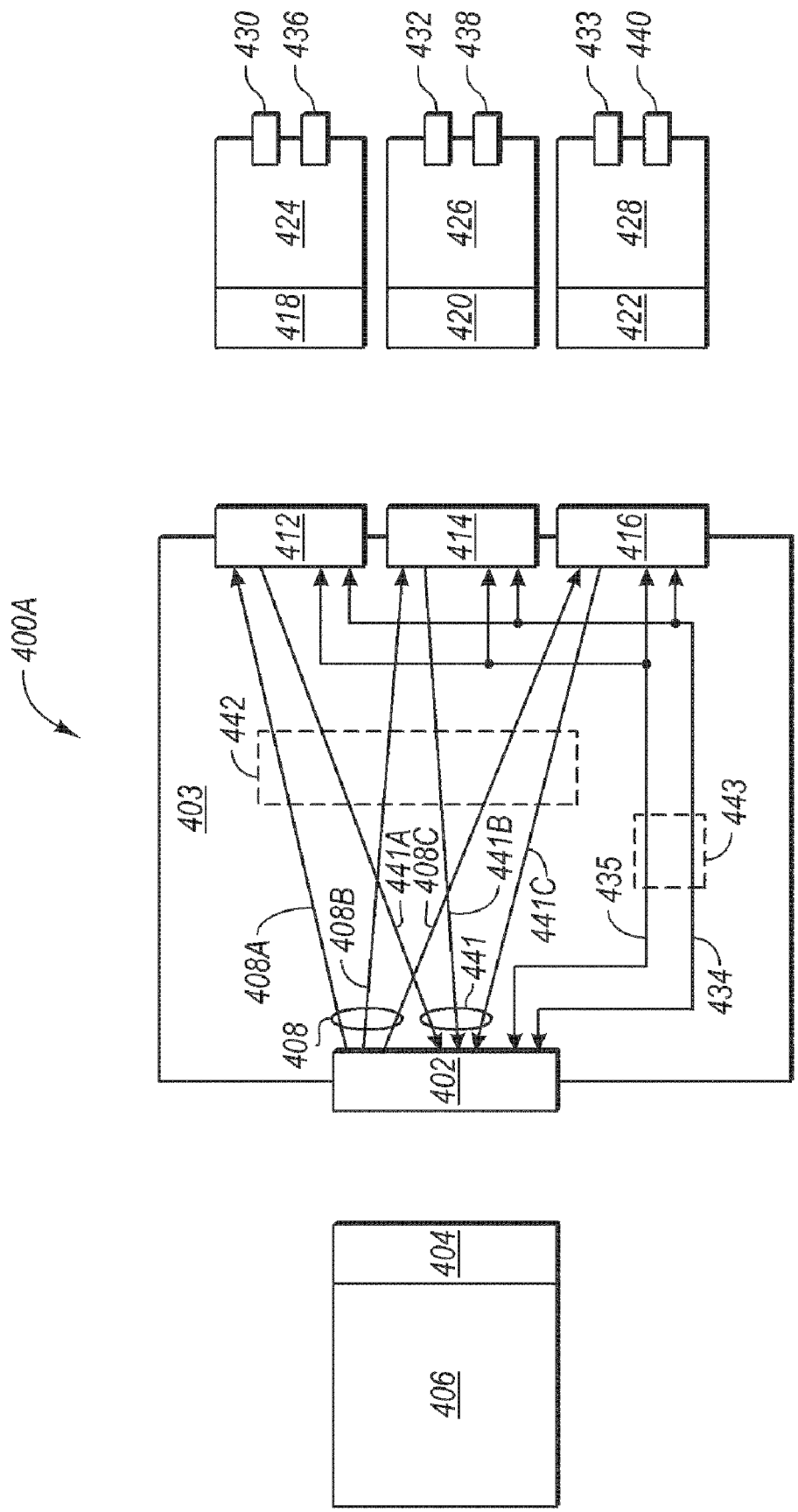
FIGS. 4A-4B disclose examples of an adapter configured to provide an interface between a host device compliant with a first MSA and three optoelectronic modules conforming to a second MSA.

Referring now to FIG. 4A, a second embodiment of an adapter, designated generally at 400A, is shown which may correspond to the adapter 204 of FIG. 2. The adapter 400A of FIG. 4A is similar in some respects to the adapter 300A of FIG. 3A. In contrast to the adapter 300A of FIG. 3A, however, the adapter 400A of FIG. 4A is configured to provide an interface between a host device conforming to a first form-factor and three, rather than two, optoelectronic modules conforming to a second form-factor.

In more detail, the adapter 400A includes a first connector 402 connected to a PCB 403 and configured to mate with a corresponding connector 404 of a host device 406. The first connector 402 can be defined by the CFP MSA and can include a CAUI high-speed interface and/or a 12×10 G high-speed interface in some embodiments. A parallel transmit bus 408 is connected to the first connector 402 and is configured to carry parallel electrical data signals from the first connector 402 to second connectors 412, 414, 416 connected to the PCB 403. In the present embodiment, the transmit bus 408 is split into three portions 408A, 408B, and 408C, each portion connected to second connector 412, 414, or 416.

In some embodiments, the parallel transmit bus 408 is a 10-line parallel transmit bus, divided into first and second 4-line portions 408A and 408B and a third 2-line portion 408C. Such a configuration can allow, for example, two QSFP optoelectronic modules connected to second connectors 412, 414 to each receive 4×10 G parallel electrical data signals while a third QSFP module connected to second connector 416 receives 2×10 G parallel electrical data signals for an aggregate transmit data rate of 100 G. This configuration provides the same 100 G aggregate transmit data rate for a CFP-compliant host device as a single 100 G CFP optoelectronic module would provide.

Alternately or additionally, the parallel transmit bus 408 can include a 12-line parallel transmit bus divided into three 4-line portions 408A-408C. Such a configuration can allow three QSFP optoelectronic modules connected to second connectors 412, 414, 416 to each receive 4×10 G parallel electrical data signals for an aggregate transmit data rate of 120 G.

Returning to FIG. 4, each of the second connectors 412, 414, 416 is configured to mate with a corresponding connector 418, 420, 422 on optoelectronic modules 424, 426, 428. In some embodiments, each of the second connectors 412, 414, 416 is defined by the QSFP MSA and includes a XLAUI high-speed interface as specified by the QSFP MSA. Further, each of the optoelectronic modules 424, 426, 428 can comprise a 40 G QSFP form-factor module. Each of the optoelectronic modules 424, 426, 428 can be configured similar to the optoelectronic module 322B of FIG. 3B with a plurality of laser drivers and lasers for converting parallel electrical data signals received from the host device 406 via adapter 400A to one or more optical signals and outputting the one or more optical signals onto one or more optical fibers via one or more optical connectors 430, 432, 433.

The adapter 400A can also include a hardware interface 434 and/or a firmware interface 435 connected between the first connector 402 and the second connectors 412, 414, 416.

One or more optical signals are also received by the optoelectronic modules 424, 426, 428 from one or more optical fibers via one or more optical connectors 436, 438, 440. Each of the optoelectronic modules may include a plurality of photodetectors and amplifiers, similar to the optoelectronic module 322B of FIG. 3B, for converting the one or more optical signals to parallel electrical data signals. The parallel electrical data signals are sent through the second connectors 412, 414, 416 and over a parallel receive bus 441.

Similar to the transmit bus 408, the receive bus 441 can be a 10-line parallel receive bus divided into first and second 4-line portions 441A, 441B and a third 2-line portion 441C configured to achieve an aggregate receive data rate of 100 G. Alternately, the receive bus 441 can be a 12-line parallel receive bus divided into three 4-line portions 441A-441C configured to achieve an aggregate receive data rate of 120 G.

Optionally, the adapter 400A can include circuitry 442 connected to the PCB 403 on the transmit bus 408 and/or receive bus 441 and configured to provide signal processing on the parallel electrical data signals carried by the transmit bus 408 and/or receive bus 441. Similar to the circuitry 332 of FIG. 3A, the circuitry 442 can include a plurality of CDRs, EDCs, and/or FECs.

Alternately or additionally, the adapter 400A can include a device 443, such as a micro-controller or PLD, configured to translate signals received from the host device 406 via hardware interface 434 and/or firmware interface 435 to a format understandable by the optoelectronic modules 424, 426, 428 and vice versa. Alternately or additionally, the adapter 400A can be configured to convert a power supply received from the host device 406 to a power supply that can be used by the optoelectronic modules 424, 426, 428. Alternately or additionally, the adapter 400A can be configured to provide thermal management for the optoelectronic modules 424, 426, 428.

Figure 4B:
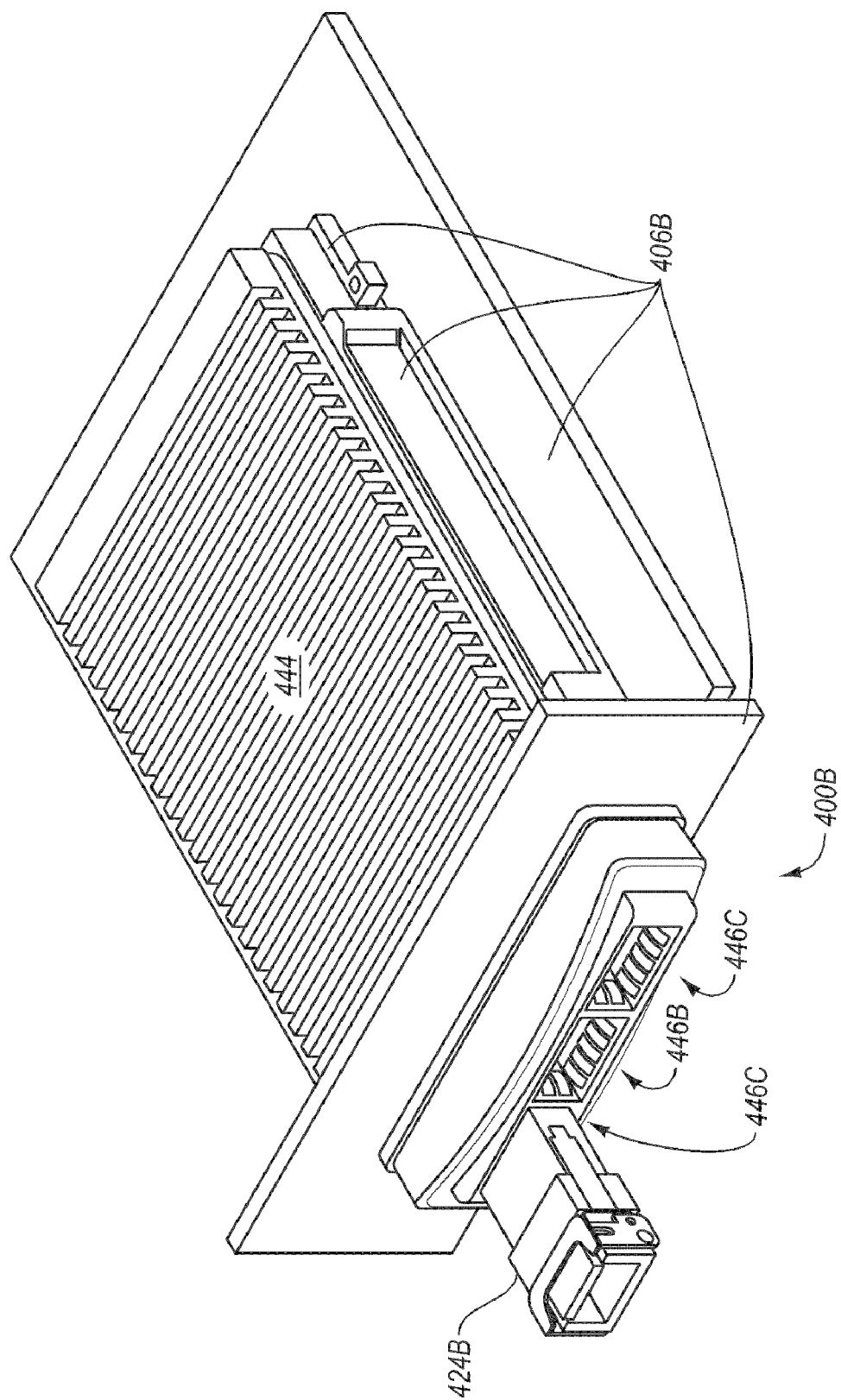

FIG. 4B discloses a perspective view of an example 400B of the adapter 400A of FIG. 4A. As shown, the adapter 400B is plugged into a host device 406B and includes a body 444 configured to substantially conform to the CFP MSA. The adapter 400B includes three receptacles 446A, 446B, 446C extending into the body 444, each receptacle 446A-446C configured to receive optoelectronic modules configured to substantially conform to the QSFP MSA. In particular, one optoelectronic module 424B substantially conforming to the QSFP MSA is shown partially inserted into the receptacle 446C and the receptacles 446A and 446B are configured to receive similarly configured optoelectronic modules.

A PCB (not shown) corresponding to the PCB 403 of FIG. 4A may be disposed within the body 444. The first connector 402, second connectors 412, 414, 416, a plurality signal processing circuitry 442 and/or device 443 of FIG. 4A can be disposed on the PCB within the body 444 of the adapter 400B.

In the example embodiment of FIGS. 4A-4B, adapters 400A and 400B (collectively referred to herein as "adapter 400") can include the same mechanical form-factor, host-side electrical interface, and other aspects defined by the CFP MSA as the dedicated CFP module 100 of FIG. 1 which can be configured for a data rate substantially equal to 100 G. However, the adapter 400 also includes three module-side receptacles 446A-446C and corresponding electrical interfaces to receive three lower data rate QSFP modules, each configured for a data rate substantially equal to 40 G. In this case, the use of three lower data rate QSFP modules can result in an aggregate data rate of 100 G or 120 G, depending on the configuration of the transmit bus 408 and receive bus 441 as explained above, that matches or exceeds the 100 G aggregate data rate specified by the CFP MSA for the CFP-compliant host device 406B.

IV. Third Embodiment

Figure 5A:
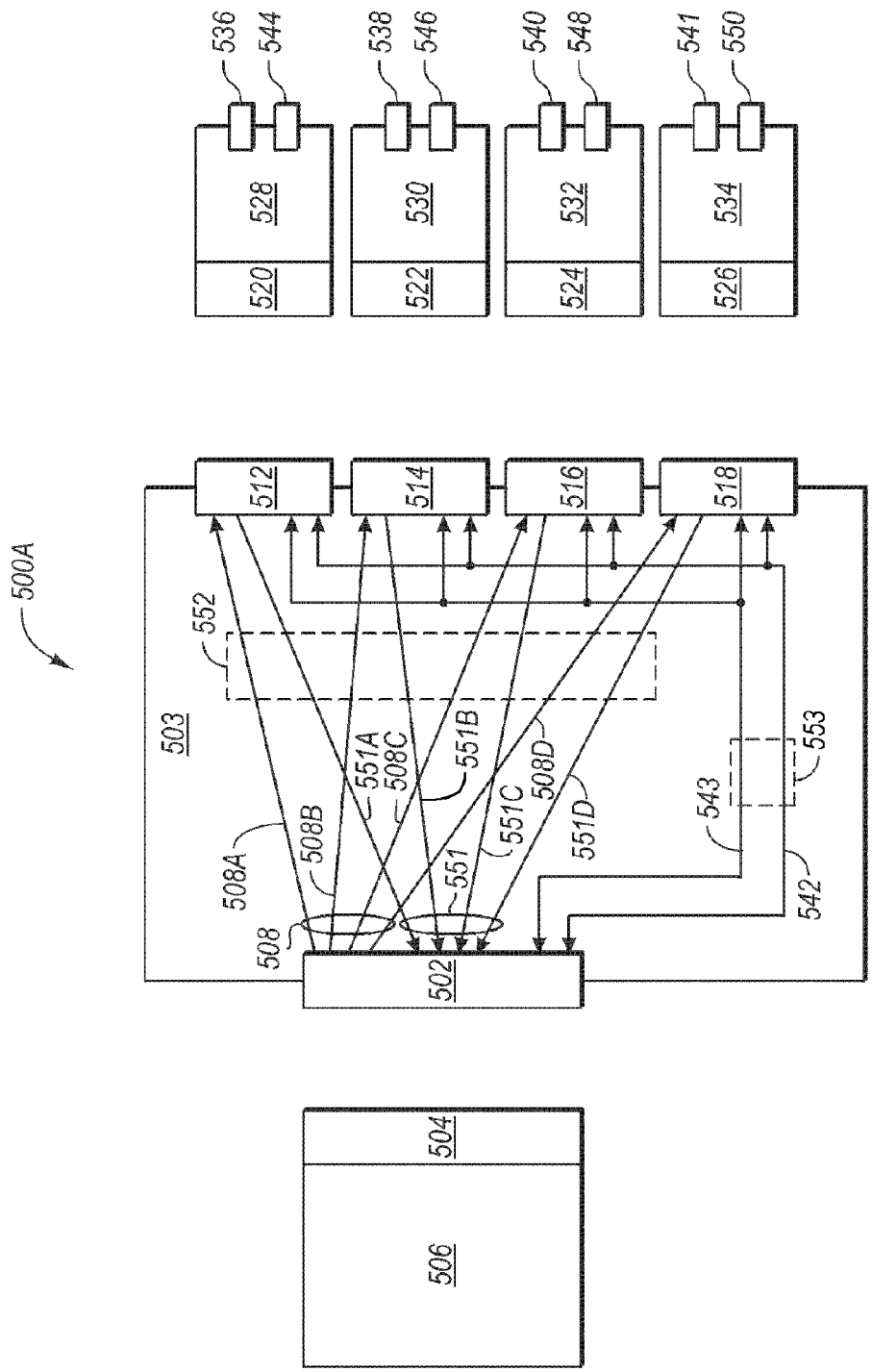
FIGS. 5A-5B disclose examples of an adapter configured to provide an interface between a host device compliant with a first MSA and four optoelectronic modules conforming to a second MSA.

Referring now to FIG. 5A, a third embodiment of an adapter, designated generally at 500A, is shown which may correspond to the adapter 204 of FIG. 2. The adapter 500A of FIG. 5A is similar in some respects to the adapter 300A of FIG. 3A. In contrast to the adapter 300A of FIG. 3A, however, the adapter 500A of FIG. 5A is configured to provide an interface between a host device conforming to a first form-factor and four, rather than two, optoelectronic modules conforming to a second form-factor.

In more detail, the adapter 500A includes a first connector 502 connected to a PCB 503 and configured to mate with a corresponding connector 504 of a host device 506. The first connector 502 can be defined by the CFP MSA and can include a XLAUI high-speed interface—specified by the CFP MSA for some applications. A 4-line parallel transmit bus 508 is connected to the first connector 502 and is configured to carry parallel electrical data signals from the first connector 502 to second connectors 512, 514, 516, 518 connected to PCB 503. In the present embodiment, the transmit bus 508 is split into four portions 508A, 508B, 508C, and 508D, each portion connected to second connector 512, 514, 516 or 518 such that each second connector 512, 514, 516, 518 receives a different one of the four parallel electrical data signals.

Each of the second connectors 512, 514, 516 and 518 is configured to mate with a corresponding connector 520, 522, 524, 526 on optoelectronic modules 528, 530, 532, 534. In some embodiments, each of the second connectors 512, 514, 516, 518 is defined by the SFP+ MSA and includes a 1×10 G ("XFI") high-speed interface. Further, each of the optoelectronic modules 528, 530, 532, 534 can comprise an SFP+ form-factor module. Each of the optoelectronic modules 528, 530, 532, 534 can include a laser driver and laser for converting an electrical data signal to an optical signal and a photodiode and amplifier for converting an optical signal to an electrical data signal. For instance, each optoelectronic module 528, 530, 532, 534 can use a laser driver and laser to convert an electrical signal to an optical signal and output the optical signal onto an optical fiber via optical connectors 536, 538, 540, 541.

The adapter 500A can also include a hardware interface 542 and/or a firmware interface 543 connected between the first connector 502 and second connectors 512, 514, 516, 518.

An optical signal is received by each of the optoelectronic modules 528, 530, 532, 534 from an optical fiber via an optical connector 544, 546, 548, 550. As mentioned, each of the optoelectronic modules 528, 530, 532, 534 can include a photodetector and amplifier for converting each received optical signal to an electrical data signal. The electrical data signal from each optoelectronic module 528, 530, 532, 534 is sent through the second electrical interfaces 512, 514, 516, 518 and over a 4-line parallel receive bus 551. The receive bus 551 is split into four portions 551A, 551B, 551C, 551D, each portion being connected to second connector 512, 514, 516 or 518.

Optionally, the adapter 500A can include circuitry 552 connected to the PCB 503 on the transmit bus 508 and/or receive bus 551 and configured to provide signal processing on the parallel electrical data signals carried by the transmit bus 508 and/or receive bus 551. Similar to the circuitry 332 of FIG. 3A, the circuitry 552 can include a plurality of CDRs, EDCs, and/or FECs.

Alternately or additionally, the adapter 500A can include a device 553, such as a micro-controller or PLD, configured to translate signals received from the host device 506 via hardware interface 542 and/or firmware interface 543 to a format understandable by the optoelectronic modules 528, 530, 532, 534 and vice versa. Alternately or additionally, the adapter 500A can be configured to convert a power supply received from the host device 506 to a power supply that can be used by the optoelectronic modules 528, 530, 532, 534. Alternately or additionally, the adapter 500A can be configured to provide thermal management for the optoelectronic modules 528, 530, 532, 534.

Figure 5B:
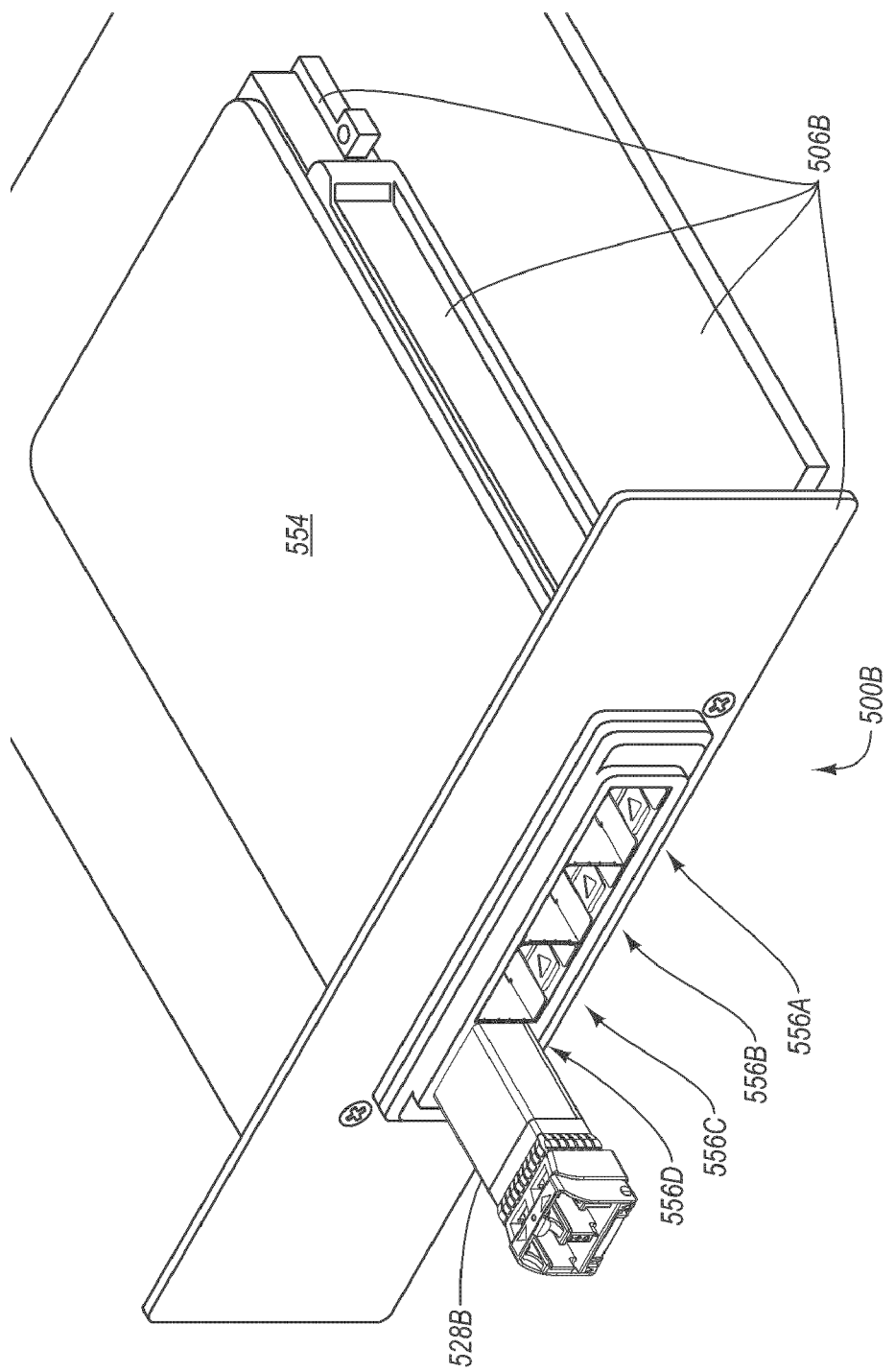

FIG. 5B discloses a perspective view of a specific example 500B of the adapter 500A of FIG. 5A. As shown, the adapter 500B is plugged into a host device 506B and includes a body 554 configured to substantially conform to the CFP MSA. The adapter 500B includes four receptacles 556A, 556B, 556C, 556D extending into the body 554, each receptacle 556A-556D configured to receive optoelectronic modules configured to substantially conform to the SFP+MSA. In particular, one optoelectronic module 528B substantially conforming to the SFP+MSA is shown partially inserted into the receptacle 556D and the receptacles 556A-556C are configured to receive similarly configured optoelectronic modules.

A PCB (not shown) corresponding to the PCB 503 of FIG. 5A may be disposed within the body 554. The first connector 502, second connectors 512, 514, 516, 518, signal processing circuitry 552 and/or device 553 of FIG. 5A can be disposed on the PCB within the body 554 of the adapter 500B.

In the example embodiment of FIGS. 5A-5B, adapters 500A and 500B (collectively referred to herein as "adapter 500") can include the same mechanical form-factor, host-side electrical interface, and other aspects defined by the CFP MSA as the dedicated CFP module 100 of FIG. 1 which can be configured for a data rate substantially equal to 40 G in some applications. However, the adapter 500 also includes four module-side receptacles 556A-556D and corresponding electrical interfaces to receive four lower data rate SFP+ modules, each configured for a data rate substantially equal to 10 G. In this case, the use of four lower data rate SFP+ modules can result in an aggregate data rate of 40 G that matches the 40 G aggregate data rate specified by the CFP MSA for some applications for the CFP-compliant host device 506.

V. Fourth Embodiment

Figure 6:
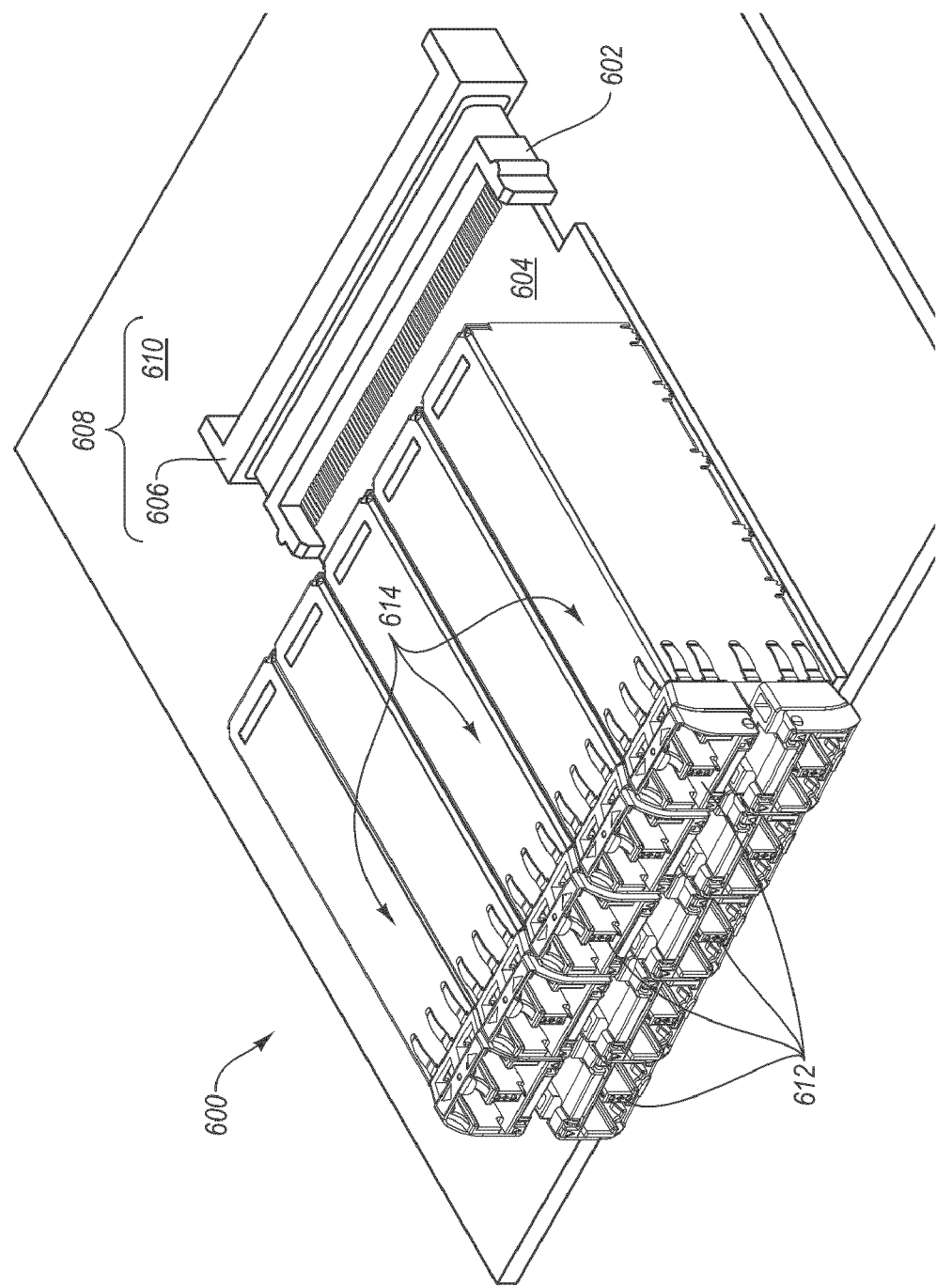
FIG. 6 discloses an example of an adapter configured to provide an interface between a host device partially compliant with a first MSA and ten optoelectronic modules conforming to a second MSA.

Referring now to FIG. 6, a fourth embodiment of an adapter, designated generally at 600, is shown which may correspond to the adapter 204 of FIG. 2. The adapter 600 of FIG. 6 is configured to provide an interface between a host device conforming to a first form-factor and ten optoelectronic modules conforming to a second form-factor.

The adapter 600 includes a first connector 602 connected to an adapter PCB 604 and configured to mate with a corresponding connector 606 of a host device 608 that further includes a host PCB 610. In some embodiments, the adapter 600 does not conform to a standardized MSA at all, although some of the components of the adapter 600 do conform to a standardized MSA. For instance, the first connector 602 can be defined by the CFP MSA and can include a CAUI high-speed interface, despite the fact that the mechanical form-factor of the adapter 600 may not conform to the CFP MSA.

Although not shown, the adapter 600 can include a 10-line parallel transmit bus connected to the first connector 602 that is configured to carry parallel electrical data signals from the first connector 602 to a plurality of second connectors configured to mate with corresponding connectors of optoelectronic modules 612. Each of the second connectors (not shown) can be defined by the SFP+ MSA and can include a XFI high-speed interface as specified by the SFP+ MSA. Further, each of the optoelectronic modules 612 can comprise an SFP+ form-factor module. The adapter can also include a 10-line parallel receive bus (not shown) connected to the second connectors and configured to carry parallel electrical data signals from the second connectors to the first connector 602.

Optionally, the adapter 600 can include a hardware interface, firmware interface, signal processing circuitry, and/or micro-controller/PLD device providing analogous functionality to the adapter 600 as the hardware interfaces, firmware interfaces, signal processing circuitry, and/or micro-controller/PLD devices of FIGS. 3A-5B. The adapter 600 further includes a plurality of receptacles 614 configured to receive optoelectronic modules 612.

The embodiments of FIGS. 3A-6 have been described in the context of an adapter module that substantially conforms to the CFP MSA in mechanical form-factor, electrical interface, and/or thermal management and that is configured to provide an interface between a host device and two or more optoelectronic modules that substantially conform to the SFP+ MSA or QSFP MSA in mechanical form factor, electrical interface, and/or thermal interface, for example. Alternately or additionally, some or all of the aspects of the adapter module can substantially conform to an MSA other than the CFP MSA. Alternately or additionally, the two or more optoelectronic modules can substantially conform to an MSA other than the SFP+ MSA or QSFP MSA.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An adapter module, comprising:
a body configured to substantially conform to a first form-factor;
a plurality of receptacles extending into the body, the plurality of receptacles configured to receive optoelectronic modules that substantially conform to a second form factor that is smaller than the first form factor; and
a printed circuit board disposed within the body and signal processing circuitry disposed on the printed circuit board, the signal processing circuitry configured to process parallel transmit signals transmitted to the plurality of optoelectronic modules from a host device in order to divide the parallel transmit signals into sets of parallel transmit signals that are compatible with an electrical interface of the plurality of optoelectronic modules.

2. The adapter module of claim 1, wherein the first form factor is defined by the 100 form-factor pluggable ("CFP") multi-source agreement ("MSA") and the second form factor is defined by one of: the small form-factor pluggable plus ("SFP+") MSA, or the quad small form-factor pluggable ("QSFP") MSA.

3. The adapter module of claim 1, wherein the plurality of receptacles comprises two, three, or four receptacles.

4. The adapter module of claim 1, wherein the signal processing circuitry is further configured to process receive signals received by the plurality of optoelectronic modules from an optical communication network in order to combine the receive signals into parallel receive signals that are compatible with an electrical interface of the host device.

5. The adapter module of claim 1, wherein the signal processing circuitry includes a plurality of clock and data recovery circuits, a plurality of electronic dispersion compensation circuits, or a plurality of forward error correction circuits.

6. The adapter module of claim 1, further comprising a device coupled to the printed circuit board configured to facilitate one or more of status, alarm, and control functions for the plurality of optoelectronic modules, the device comprising a micro-controller or a programmable logic device.

7. An adapter module configured to provide an interface between a host device port having a first form-factor and a plurality of optoelectronic modules having a second form-factor that is smaller than the first form-factor, comprising:
a first connector configured to couple to a mating connector on a host device;
a parallel transmit bus coupled to the first connector and configured to carry a first plurality of parallel data signals;
a plurality of second connectors, each of the plurality of second connectors coupled to a different portion of the parallel transmit bus and configured to couple to a different one of a plurality of optoelectronic modules; and
a parallel receive bus having a plurality of portions, each of the plurality of portions coupled to a different one of the plurality of second connectors, wherein the parallel receive bus is configured to transmit a second plurality of parallel data signals from the plurality of second connectors to the first connector.

8. The adapter module of claim 7, wherein each of the plurality of optoelectronic modules comprises a module substantially compliant with: the small form-factor pluggable plus ("SFP+") multi-source agreement ("MSA"), or the quad small form-factor pluggable ("QSFP") MSA.

9. The adapter module of claim 7, wherein the adapter module is substantially compliant with the 100 form-factor pluggable ("CFP") multi-source agreement ("MSA").

10. The adapter module of claim 7, further comprising a plurality of receptacles configured to mechanically secure a different one of the plurality of optoelectronic modules in the adapter module.

11. The adapter module of claim 7, further comprising:
a printed circuit board to which the first connector and the second connector are connected; and
a device disposed on the printed circuit board and configured to provide one or more of status, alarm, and control functions for the plurality of optoelectronic modules, the device comprising a micro-controller or programmable logic device.

12. The adapter module of claim 7, wherein the first connector includes a 10×10G CAUI high-speed interface, a 4×10G XLAUI high-speed interface, or two 4×10G XLAUI high-speed interfaces and each of the second connectors includes a 4×10G XLAUI high-speed interface or a 1×10G XFI high-speed interface.

13. The adapter module of claim 7, wherein the adapter module is configured to convert a power supply received from the host device to a power supply that can be used by each of the plurality of optoelectronic modules.

14. The adapter module of claim 7, wherein the adapter module provides thermal management for each of the plurality of optoelectronic modules.

15. The adapter module of claim 7,
wherein:
the host device is configured to send parallel data signals that require signal processing before being optically transmitted and to receive parallel data signals that have received signal processing; and
each of the optoelectronic modules is configured to convert parallel data signals to optical signals and optical signals to parallel data signals without performing the required signal processing; and
the adapter module further comprises signal processing circuitry disposed on the parallel transmit bus and the parallel receive bus and configured to provide the required signal processing on the first plurality of parallel data signals and the second plurality of parallel data signals.

16. The adapter module of claim 15, wherein the signal processing circuitry includes:
a plurality of clock and data recovery circuits configured to re-time the first and second plurality of parallel data signals;
a plurality of electronic dispersion compensation circuits configured to condition the first and second plurality of parallel data signals; or
a plurality of forward error correction circuits configured to perform forward error correction on the first and second plurality of parallel data signals.

17. An adapter module, comprising:
a body configured to substantially conform to a first form-factor;
a printed circuit board disposed within the body;
a first connector connected to the printed circuit board and configured to couple to a mating connector on a host device, the host device including a receptacle configured to receive the body;
a plurality of second connectors connected to the printed circuit board, each configured to couple to an optoelectronic module substantially conforming to a second form-factor;
a parallel transmit bus coupled between the first connector and the plurality of second connectors and configured to carry a first plurality of parallel data signals from the first connector to the plurality of second connectors; and
a parallel receive transmit bus coupled between the plurality of second connectors and the first connector and configured to carry a second plurality of parallel data signals from the plurality of second connectors to the first connector.

18. The adapter module of claim 17, further comprising a plurality of receptacles extending into the body, each of the plurality of receptacles configured to receive an optoelectronic module conforming to the second form-factor.

19. The adapter module of claim 18, wherein the first form-factor is defined by the 100 form-factor pluggable ("CFP") multi-source agreement ("MSA") and wherein one of:
the plurality of receptacles comprises two receptacles, each of the two receptacles configured to receive an optoelectronic module conforming to the quad small form-factor pluggable ("QSFP") MSA;
the plurality of receptacles comprises three receptacles, each of the three receptacles configured to receive an optoelectronic module conforming to the QSFP MSA;
the plurality of receptacles comprises four receptacles, each of the four receptacles configured to receive an optoelectronic module conforming to the small form-factor pluggable plus ("SFP+") MSA.

20. The adapter module of claim 17, further comprising a device configured to convert low-speed signals having a first protocol and received from the host device via a hardware interface or a firmware interface to a second protocol for each optoelectronic module coupled to the plurality of second connectors and to convert low-speed signals having the second protocol to the first protocol for the host device, the device comprising a micro-controller or a programmable logic device.

* * * * *